July 1, 1941.   W. A. THUM   2,247,674
MECHANISM FOR SUBDIVIDING SLICED BAKED BREAD LOAVES
Filed June 21, 1939   2 Sheets-Sheet 1

INVENTOR
Walter A. Thum,
ATTORNEY

July 1, 1941. W. A. THUM 2,247,674
MECHANISM FOR SUBDIVIDING SLICED BAKED BREAD LOAVES
Filed June 21, 1939 2 Sheets-Sheet 2

INVENTOR
Walter A Thum.
BY
ATTORNEY

Patented July 1, 1941

2,247,674

UNITED STATES PATENT OFFICE 2,247,674

MECHANISM FOR SUBDIVIDING SLICED BAKED BREAD LOAVES

Walter A. Thum, St. Louis, Mo., assignor to Papendick, Inc., St. Louis, Mo., a corporation of Missouri Application June 21, 1939, Serial No. 280,396

15 Claims. (Cl. 146—153)

This invention relates generally to sliced baked bread loaf handling mechanism. More particularly, this invention relates to a certain new and useful improvement in mechanism for subdividing sliced baked bread loaves into fractions and has for its chief object the provision of a mechanism uniquely constructed and automatically operable for fractionating the successive sliced loaves speedily, smoothly, and without injury.

And with the above and other objects in view, my invention resides in the novel features of form, construction arrangement, and combination of parts presently described and pointed out in the claims.

In the accompanying drawings (two sheets)—

Figures 1, 2, 3:
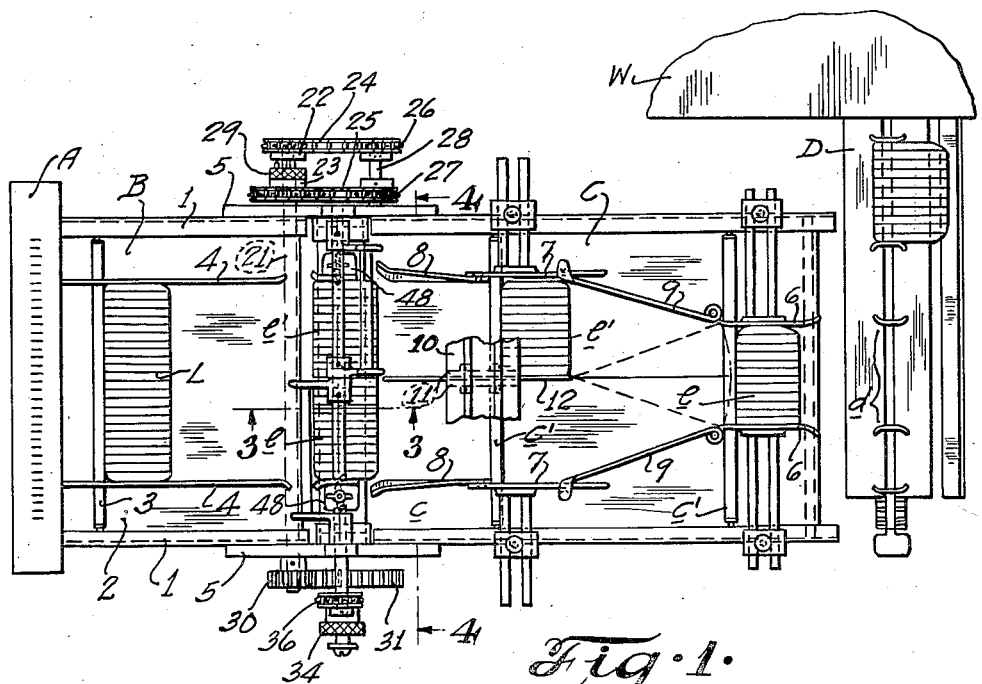
Figure 1 is a top plan view of a baked bread loaf fractionating mechanism constructed in accordance with and embodying my present invention.
Figure 2 is a side elevational view of the mechanism.
Figure 3 is a fragmentary longitudinal sectional view of the mechanism, taken approximately along the line 3—3, Figure 1.

Referring now in more detail and by reference characters to the drawings, which illustrate practical embodiments of my present invention, A designates a conventional bread loaf slicing machine preferably, though not necessarily, of the vertically reciprocating knife type.

Disposed at the discharge end of the machine A, is a first or discharge conveyor means B, which preferably includes a pair of opposed side rails 1, a horizontally disposed conveyor table 2, a series of conventional chain-driven or carried flight-bars 3, and a pair of opposed parallel side guides 4 also of substantially conventional design for confining the successively sliced loaves.

Bolted or otherwise secured upon and projecting forwardly from the side rails 1, is a pair of opposed parallel connector plates 5 for supporting engagement with the rearward end of a table c of a second or fractionating transfer conveyor means C substantially of the type and character fully disclosed and described in a co-pending application Serial No. 280,397, filed June 21, 1939, by Gustav C. Papendick and Walter A. Thum, the table c being disposed horizontally on the same plane with the table 2 and the conveyor means C comprising preferably a series of suitably spaced flight-bars c' chain-connected for movement over the table c, a pair of loaf-fraction guides 6 presented forwardly over the table c and adjustable transversely of the machine, a pair of rear loaf-fraction guides 7 also adjustable transversely of the machine and pivotally provided with rearwardly projecting preferably axially twisted extensions 8, and a pair of loaf-fraction guides 9 disposed intermediate, and having connection for adjustment with, the guides 6 and 7, all as best seen in Figure 1 and for purposes presently fully appearing. Also preferably forming part of the transfer conveyor means C, is a bridge member 10 spanning the table c, and equipped with a depending lug 11 for supporting an intermediate guide 12, best seen in Figure 2 and for purposes presently appearing.

Operatively disposed at the forward or discharge end of the table c of the second or transfer conveyor means C, is the intake conveyor D of a wrapping machine W, the conveyor D having a plurality of spaced loaf-fraction receiving pockets d and being preferably driven in predetermined timed relation to the respective series of flight-bars 3 and c', for purposes presently fully appearing.

Figure 4:
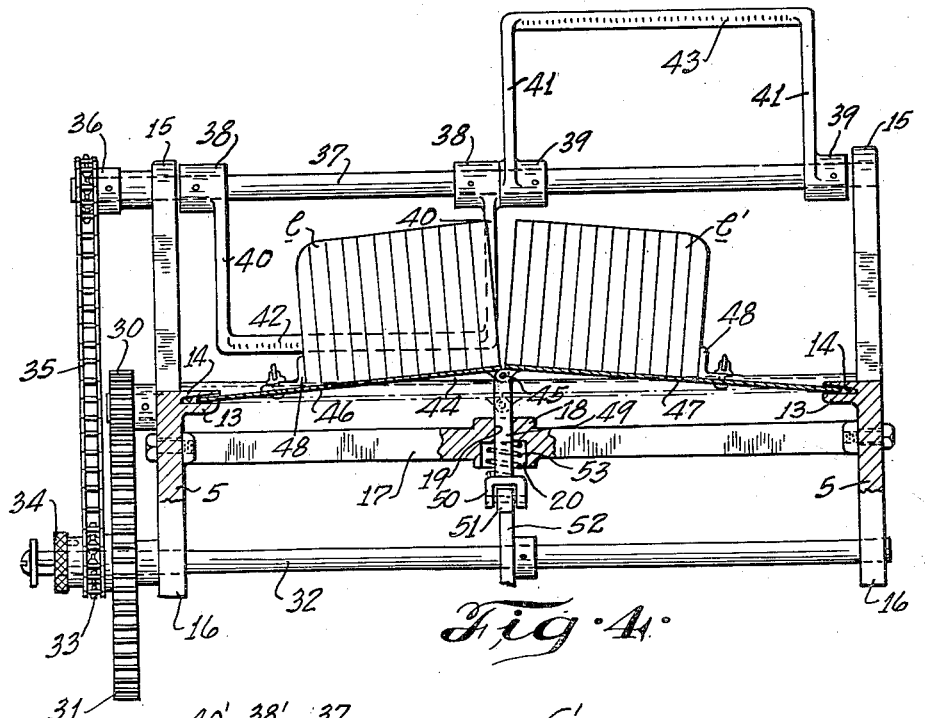
Figure 4 is an enlarged transverse sectional view of the mechanism, taken approximately along the line 4—4, Figure 1.

Formed preferably integrally with the connection-plates 5 and disposed intermediate the first conveyor means B and the second conveyor means C, are flanges 13 presented inwardly of the machine and provided with opposed ways 14 flaringly opening inwardly of the machine, as best seen in Figure 4.

Also formed preferably integrally with the connection-plates 5 and disposed intermediate the first conveyor means B and second or transfer conveyor means C, are pairs of transversely spaced upwardly and downwardly extending parallel bracket arms 15, 16, respectively. Bolted or otherwise secured at its opposite ends upon the lower bracket arms 16 and extending transversely of the machine beneath the slotted flanges 13, is a cross-frame 17 centrally enlarged, as at 18, and vertically bored, as at 19, the frame 17 being counter-bored on its under face in the provision of a diametrically enlarged recess 20, all as best seen in Figure 4 and for purposes presently fully appearing.

Journaled in and extending through the side frames 1 and disposed horizontally beneath the conveyor table 2, is a transverse drive-shaft 21 provided on its one extended end with a pair of axially spaced free-running sprockets 22, 23, respectively connected by drive chains 24, 25, to driving sprockets 26, 27, pinned, keyed, or otherwise fixed upon the extended end of a drive-shaft 28 of the flight-bars c'. Shiftably keyed upon the drive-shaft 21 intermediate the free-running sprockets 22, 23, is a conventional pin clutch disk 29 for optional driving engagement with either of the free-running sprockets 22, 23. It may be pointed out in this connection that the sprockets 22, 23, have driving ratios of 1—1 and 2—1, respectively, to the sprockets 26, 27, with which they are connected, so that, by shifting the pin clutch member 29, the spaced flight-bars c' of the second conveyor means C may be selectively driven at either the same speed or twice the speed of the flight-bars 3 of the first conveyor means B for feeding the fractions to one or more wrapping machines, as presently appearing.

On its other extended end, the drive-shaft 21 is provided with a pinion 30 meshing with a large driving gear 31 pinned or otherwise fixed upon the extended end of a transverse cam-shaft 32 journaled in the bracket-arms 16 and extending horizontally of the machine preferably directly under the cross frame 17.

On an extended end and disposed outwardly of the driving gear 31, the cam-shaft 32 is provided with a free-running sprocket 33 and a shiftable conventional pin clutch member 34 for disengageably connecting the sprocket 33 for rotation with the cam-shaft 32, the sprocket 33 being drivingly connected through a sprocket chain 35 to a sprocket 36 fixed upon an extended end of an auxiliary shaft 37 journaled in, and extending transversely of the machine between, the upper bracket arms 15.

Pinned in axially spaced relation upon the auxiliary shaft 37 intermediate the upper bracket arms 15, are two pairs of spaced hub-members 38, 39, provided preferably integrally with radially outwardly presented curved arms 40, 41, in turn, provided also preferably integrally at their other extremities with horizontally disposed pusher-bars 42, 43; the pairs of hub-members 38, 39, being preferably so relatively fixed on the shaft 37 that the pusher-bars 42, 43, are disposed on diametrically opposite sides of the auxiliary shaft 37, all as best seen in Figures 2 and 4 and for purposes presently fully appearing.

Loosely mounted for movement at its opposite side margins in the flange-slots 14 and extending transversely of the machine between the connection-plates 5 in the space between the first conveyor means B and the transfer or second conveyor means C, is a split plate 44 centrally hinged, as at 45, and the two flat sections 46, 47, thereof being suitably adjustably equipped with opposed preferably L-shaped loaf guides 48, all as best seen in Figures 1 and 4 and for purposes presently fully appearing.

Pivotally connected at its upper end to the hinge 45 of the split plate 44 and disposed for endwise movement in the bore 19 of the cross frame 17, is an actuating rod 49 provided at its lower end with an enlarged downwardly presented bifurcation or yoke member 50 having a follower-roller 51 engaging a cam 52 pinned or otherwise fixed upon the shaft 32, the actuating rod 49 being normally yieldingly urged downwardly for engagement between the roller 51 and cam 52 by means of a compression spring 53 coiled on the rod 49 and impinging at one end against the bottom wall of the recess 20 and at its other end the upper face of the bight of the bifurcation or yoke member 50, all as best seen in Figure 4 and for purposes presently fully appearing.

In use and operation, the sliced loaves L are progressed forwardly by the flight-bars 3 of the first conveyor means B and successively deposited upon the horizontally disposed split plate 44 between the guides 48, and it may be here stated that the cam 52 is so shaped and timed with respect to the movement of the flight-bars 3 that, in the interval during which a loaf L is being discharged by the flight-bar 3, the split plate 44 is in horizontal position, as indicated in dot-dash lines in Figure 4. In the next interval, the cam 52 shifts the cam roller 51 and the associated actuating rod 49 sharply upwardly, obliquely hinging the split plate 44 and breaking or dividing the deposited loaf L along a selected slice-cut into two fractions l, l', as shown in Figure 4. Meanwhile, the auxiliary shaft 37 is rotated in timed relation with the movement of the cam 52, so that the one pusher bar 42 is brought into engagement with the tilted loaf fraction l, which latter is thereby shifted forwardly off of the split plate section 46 and smoothly and evenly onto the table c of the transfer conveyor means C, where such fraction is picked up and progressed forwardly over the table c by a bar c' in substantially the manner described in said co-pending application Serial No. 280,397. Subsequently, the other rotary pusher bar 43 moves into engagement with the remaining tilted fraction l', which is similarly shifted forwardly from the split plate section 47 onto the table c of the transfer conveyor means C for progression over the table c by the next succeeding flight-bar c'.

As the pusher bar 43 completes its fraction-advancing movement, the cam 52 has been so rotatively actuated that the roller 51 and associated bar 49 move downwardly under the influence of the spring 53 and return the split plate 44 to its initial horizontal position for receiving the next succeeding sliced loaf L, it being, of course, understood that the described loaf subdividing for fractionating operations are timed to take place and be completed within the length of time required for the first conveyor bars 3 to advance the next succeeding sliced loaf L for discharge upon the split plate 44.

Figure 5:
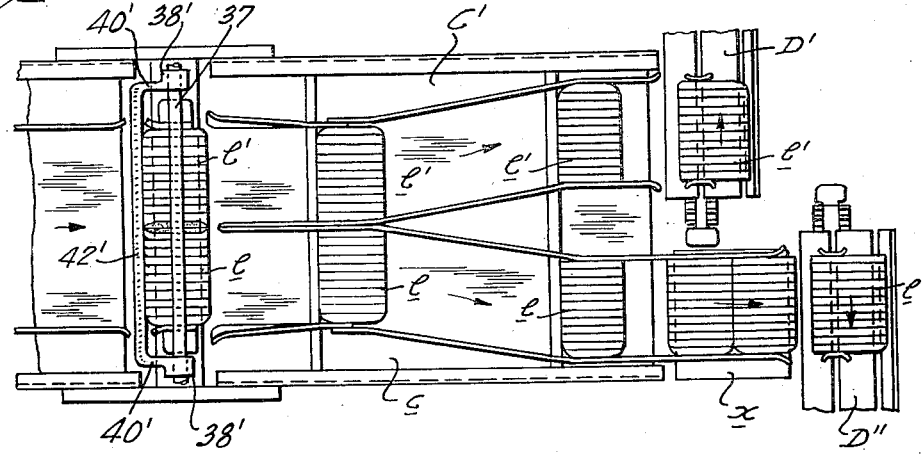
Figure 5 is a top plan view of a slightly modified form of loaf fractionating mechanism also constructed in accordance with and embodying my present invention.

In the mechanism of Figures 1 to 4, both inclusive, the successively deposited loaf-fractions l, l', as they are progressed by the bars c' over the table c, are directed by means of the guides 6, 7, into a single series for discharge in succession upon the conveyor D for delivery, in turn, to the wrapping machine W. However, in the event it is desired to feed the two loaf-fractions of the several sub-divided loaves L along separate paths into separate wrapping machines, a transfer conveyor means C' may be provided of the type more fully disclosed and described in an application Serial No. 242,432, filed November 25, 1938, by Gustav C. Papendick, and arranged for discharging loaf-fractions, respectively, into the intake conveyor D' of one wrapping machine and across a dead space x into another intake conveyor D'' of the second wrapping machine, as best seen in Figure 5. In such case, the auxiliary shaft 37 is provided merely with a single pair of axially spaced hub-members 38' supporting a single pusher bar 42' extending substantially across the entire width of the table c for simultaneously discharging upon the table c both of the loaf-fractions l, l', of the respective loaves L, as best seen in Figure 5.

The mechanism is relatively simple in structure, may be economically operated and maintained, and efficiently, speedily, smoothly, and without injury to even the most freshly baked loaf, subdivides the several successive sliced loaves into fractions for separate wrapping.

It should be understood that changes and modifications in the form, construction, arrangement, and combinations of the several parts of the mechanism may be made and substituted for those herein shown and described without departing from the nature and principle of my invention.

Having thus described my invention, what I claim and desire to secure by Letters Patent is:

1. Sliced bread loaf handling mechanism comprising, in combination, first conveyor means, second conveyor means spaced forwardly from and in longitudinal alignment with the first conveyor means, a dead plate disposed intermediate said conveyor means for successively receiving the sliced loaves from the first conveyor means, and means including pusher arms axially rotatable over the plate in timed relation with movement of the second conveyor means for transferring the loaves from said plate to, and for movement by, the second conveyor means.

2. Sliced bread loaf fractionating mechanism comprising means including a plate for subdividing a sliced bread loaf into fractions, and a plurality of pusher arms journaled for rotation over the plate for successively shifting the several fractions from said plate.

3. Sliced bread loaf fractionating mechanism including a plurality of marginally abutting flat plates normally disposed in the same plane for receiving a whole sliced loaf, said lines of abutment between the plates being substantially coincident with a selected slice-cut when the sliced loaf is resting on the plates, and means for displacing certain of said plates to different planes which are disposed obliquely to each other for displacing groups of loaf slices with respect to other groups of loaf slices for subdividing the loaf into a plurality of fractions.

4. Sliced bread loaf fractionating mechanism including a plurality of marginally adjacent flat plates normally disposed in the same plane for receiving a whole sliced loaf, means for tilting certain of said plates into oblique planes relative to each other for displacing groups of loaf slices with respect to other groups of loaf slices for subdividing the loaf into a plurality of fractions, and means for shifting the several fractions from the plates when the latter are in displaced position.

5. Sliced bread loaf fractionating mechanism including a plurality of marginally adjacent flat plates normally disposed in the same plane for receiving a whole sliced loaf, means for tilting certain of said plates into oblique planes relative to each other for displacing groups of loaf slices with respect to other groups of loaf slices for subdividing the loaf into a plurality of fractions, and means for successively shifting the several fractions from the plates when the latter are in displaced position.

6. Sliced bread loaf handling mechanism comprising, in combination, first conveyor means, second conveyor means spaced forwardly from and in longitudinal alignment with the first conveyor means, means including a pair of plate sections hingedly connected along a line parallel to a selected slice-cut and intermediate the ends of the loaves and being operatively disposed intermediate said conveyor means for successively receiving thereupon a sliced loaf from the first conveyor means and subdividing the same into fractions, and means for successively transferring the loaf-fractions of said loaf from said plate sections to the second conveyor means.

7. Sliced bread loaf handling mechanism comprising, in combination, first conveyor means, second conveyor means spaced forwardly from and in longitudinal alignment with the first conveyor means, means including a pair of plate-sections hingedly connected along a line parallel to a selected slice-cut and intermediate the ends of the loaves and being disposed intermediate said conveyor means for successively receiving thereupon a sliced loaf from the first conveyor means and sub-dividing the same into fractions, and pusher arms journaled for rotation over the plate-sections for successively transferring the loaf-fractions of said loaf from said plate-sections to the second conveyor means.

8. Sliced bread loaf handling mechanism comprising, in combination, first conveyor means, second conveyor means spaced forwardly from and in longitudinal alignment with the first conveyor means, means including a pair of plate-sections hingedly connected along a line parallel to a selected slice-cut and intermediate the ends of the loaves and being operatively disposed intermediate said conveyor means for successively receiving the sliced loaves from the first conveyor means and subdividing the same into fractions, and rotary means for transferring the loaf-fractions from said plate sections to the second conveyor means.

9. Sliced bread loaf handling mechanism comprising, in combination, first conveyor means, second conveyor means spaced forwardly from and in longitudinal alignment with the first conveyor means, means including a pair of plate-sections hingedly connected along a line parallel to a selected slice-cut and intermediate the ends of the loaves and being operatively disposed intermediate said conveyor means for successively receiving the sliced loaves from the first conveyor means and subdividing the same into fractions, and a pair of staggered rotary pushers for alternately transferring the loaf-fractions from the plate-sections to the second conveyor means.

10. Sliced bread loaf fractionating mechanism comprising a frame, a pair of plates hingedly connected along a line parallel to a selected slice-cut and intermediate the ends of the loaves and being normally disposed on the frame in the same plane for receiving a sliced loaf, and means movable on and relatively to the frame for displacing said plates to different oblique planes for correspondingly subdividing the loaf into fractions.

11. Sliced bread loaf fractionating mechanism comprising a frame, a pair of shiftable plates normally marginally adjacent and disposed on the frame in the same plane for receiving a sliced loaf, said adjacent margins being parallel to a selected slice-cut and intermediate the ends of the loaf, means movable on and relatively to the frame for displacing said plates to different oblique planes for subdividing the loaf into fractions, and means associated with the plates for substantially preventing movement of the loaf-fractions longitudinally of the plates during plate-displacing movement.

12. Sliced bread loaf fractionating mechanism comprising a frame, a pair of flat plates hingedly connected along a line parallel to a selected slice-cut and intermediate the ends of the loaves and being normally disposed yieldingly on the frame in the same plane for receiving a sliced loaf, and cam-means movable on and relatively to the frame for hingedly shifting said plates into different oblique planes for subdividing the loaf into fractions.

13. Sliced bread loaf fractionating mechanism including a frame, a pair of plates hingedly connected along a line parallel to a selected slice-cut and intermediate the ends of the loaves and being normally disposed on the frame in the same plane, means movable relatively to the frame and plates for depositing a sliced loaf upon said plates and across the hinge line therebetween, means for hingedly shifting said plates to different oblique planes for subdividing the loaf into fractions, a table on the frame, and means for shifting the several loaf-fractions successively from said plates to the table.

14. Sliced bread loaf handling mechanism comprising, in combination, first conveyor means, second conveyor means spaced forwardly from and in longitudinal alignment with the first conveyor means, supporting means disposed intermediate said conveyor means for successively receiving a sliced loaf from the first conveyor means, means cooperatively related with the supporting means for sub-dividing the sliced loaf into separate fractions, means for successively transferring the fractions of said loaf from said supporting means to the second conveyor means, and guides associated with the second conveyor means for shifting the transferred fractions into consecutive alignment.

15. Sliced bread loaf fractionating mechanism including a dead plate for receiving a sliced loaf and supporting the same in stationary position, and a pusher arm journalled for rotation over the plate and including a member rotatable into the path of the loaf for shifting only a fractional portion of the loaf from the plate.

WALTER A. THUM.